(12) United States Patent
Fu et al.

(10) Patent No.: US 12,168,539 B1
(45) Date of Patent: Dec. 17, 2024

(54) HIGH-PRECISION VERTICAL TURNOVER MACHINE AND METHOD FOR PACKAGING A PHOTOVOLTAIC ASSEMBLY

(71) Applicant: SUZHOU SC-SOLAR EQUIPMENT CO., LTD, Suzhou (CN)

(72) Inventors: Shuai Fu, Suzhou (CN); Yuelong Huang, Suzhou (CN); Hongfeng He, Suzhou (CN); Guoliang Zu, Suzhou (CN)

(73) Assignee: SUZHOU SC-SOLAR EQUIPMENT CO., LTD, Suzhou (CN)

( * ) Notice: Subject to any disclaimer, the term of this patent is extended or adjusted under 35 U.S.C. 154(b) by 0 days.

(21) Appl. No.: 18/770,335

(22) Filed: Jul. 11, 2024

(30) Foreign Application Priority Data

Feb. 23, 2024 (CN) .......................... 202410200958.9

(51) Int. Cl.
   *B65B 35/22* (2006.01)
   *B65B 35/58* (2006.01)
   *B65G 47/248* (2006.01)

(52) U.S. Cl.
   CPC .............. *B65B 35/22* (2013.01); *B65B 35/58* (2013.01); *B65G 47/248* (2013.01)

(58) Field of Classification Search
   CPC ......... B65B 35/22; B65B 35/56; B65B 35/58; B65G 47/248; B65G 57/28
   USPC ......................................... 53/544; 414/789.2
   See application file for complete search history.

(56) References Cited

U.S. PATENT DOCUMENTS

| | | | | |
|---|---|---|---|---|
| 2,508,698 A | * | 5/1950 | Von Beren ............. | B65G 57/28 414/789.2 |
| 4,460,304 A | * | 7/1984 | Dombach ............. | B65G 47/52 53/544 |
| 5,261,521 A | * | 11/1993 | Malow et al. ....... | B65G 47/248 198/409 |
| 7,516,601 B2 | * | 4/2009 | Horiuchi ................ | B65H 39/10 53/544 |

(Continued)

FOREIGN PATENT DOCUMENTS

| | | | | |
|---|---|---|---|---|
| CN | 106081572 B | * | 5/2018 | ........... B65G 47/248 |
| CN | 108216749 A | | 6/2018 | |
| CN | 210149661 U | * | 3/2020 | |

(Continued)

*Primary Examiner* — Stephen F. Gerrity
(74) *Attorney, Agent, or Firm* — Taft Stettinius & Hollister LLP

(57) ABSTRACT

A high-precision vertical turnover machine for packaging a photovoltaic assembly includes a first drum conveyor line, a horizontal transfer mechanism driving the first drum conveyor line to move left and right between a receiving station and a first turnover station, a first turnover mechanism located on the left side of the first drum conveyor line, a second turnover mechanism located on the left side of the first turnover mechanism, a distance detecting sensor detecting the distance of the front surface of the photovoltaic assembly on the first turnover mechanism or the distance of the rear surface of the photovoltaic assembly on the first turnover mechanism, and a lifting correction transfer mechanism moving, according to a detection result of the distance detecting sensor, the photovoltaic assembly on the first turnover mechanism to a second turnover station and placing the photovoltaic assembly on the second turnover mechanism precisely.

6 Claims, 8 Drawing Sheets

(56) References Cited

U.S. PATENT DOCUMENTS

2012/0300377 A1* 11/2012 Hirata et al. ......... B65G 47/248
                                                                                                    361/679.01
2021/0220877 A1    7/2021  Qi et al.

FOREIGN PATENT DOCUMENTS

| CN | 210594283 | U |   | 5/2020  |             |
|----|-----------|---|---|---------|-------------|
| CN | 112918758 | A |   | 6/2021  |             |
| CN | 113173406 | A | * | 7/2021  | B65G 47/248 |
| CN | 214191515 | U |   | 9/2021  |             |
| CN | 113716117 | A | * | 11/2021 | B65B 35/42  |
| CN | 215753191 | U |   | 2/2022  |             |
| CN | 114148657 | A | * | 3/2022  | B65G 1/04   |
| CN | 114212440 | A | * | 3/2022  | B65G 47/34  |
| CN | 115610823 | A |   | 1/2023  |             |
| CN | 116812285 | A |   | 9/2023  |             |
| CN | 117246587 | A |   | 12/2023 |             |
| CN | 117550160 | A |   | 2/2024  |             |
| JP | H08217018 | A |   | 8/1996  |             |

* cited by examiner

HIGH-PRECISION VERTICAL TURNOVER MACHINE AND METHOD FOR PACKAGING A PHOTOVOLTAIC ASSEMBLY

CROSS-REFERENCE TO RELATED APPLICATION(S)

This application claims priority to Chinese Patent Application No. 202410200958.9 filed Feb. 23, 2024, the disclosure of which is incorporated herein by reference in its entirety.

TECHNICAL FIELD

The present disclosure belongs to the field of photovoltaic assembly packaging technology and, in particular, to a high-precision vertical turnover machine and method for packaging a photovoltaic assembly.

BACKGROUND

After photovoltaic assemblies are assembled, the photovoltaic assemblies need to be stacked and packaged. During the packaging process, the stacked photovoltaic assemblies need to be turned over by 90 degrees as a whole to complete the taping of different dimensions. A photovoltaic assembly has long edges and short edges. Incoming materials before the packaging of photovoltaic assemblies are generally in the horizontal and stacked state. A device that turns over photovoltaic assemblies in the horizontal and stacked state to the vertical state with a long edge as the bottom is referred to as a horizontal turnover machine in the industry. A device that turns over photovoltaic assemblies in the horizontal and stacked state to the vertical state with a short edge as the bottom is referred to as a vertical turnover machine in the industry.

Patent publication No. CN117246587A in the existing art discloses a photovoltaic assembly turnover packaging apparatus and method. The apparatus can implement both horizontal turnover and vertical turnover of photovoltaic assemblies. However, for vertical turnover, the apparatus conveys horizontal and stacked photovoltaic assemblies to a horizontal rotation conveyor mechanism first and then rotates horizontally by 90 degrees so that short edges of the photovoltaic assemblies are aligned with a vertical turnover machine. Then the horizontal and stacked photovoltaic assemblies are conveyed to the vertical turnover machine with short edges in front and then are directly through the vertical turnover machine, turned over by 90 degrees at one time with the short edges as turnover bottom edges so that the photovoltaic assemblies turned over are in the vertical state with the short edges as the bottom and then are conveyed out. During this process, the problems below exist.

1. When the photovoltaic assemblies are turned over on the vertical turnover machine, the photovoltaic assemblies need to be located on a wood pallet of the vertical turnover machine in a center-aligned manner. However, the positioning of the photovoltaic assemblies on the vertical turnover machine depends entirely on the horizontal rotation conveyor mechanism. The horizontal rotation conveyor mechanism is equipped with no mechanism for positioning positions on two sides of the photovoltaic assemblies. In this case, the position precision of the photovoltaic assemblies turned on vertically to the wood pallet cannot be guaranteed reliably and effectively.

2. During the vertical turnover process, the center of gravity is excessively high, and the design with the short edges below is very unsubstantial. In the case of a large drop during the turnover process, the short edges may easily collapse. Therefore, when the photovoltaic assemblies are turned over vertically, the distance between the side of the short edges of the horizontal and stacked photovoltaic assemblies and the surface of the wood pallet on the vertical turnover machine needs to be strictly controlled. If the distance is excessively long, a large drop may occur during the turnover process. If the distance is excessively short, a short edge of a photovoltaic assembly at the bottom may be squeezed to cause a hidden crack during the turnover process. However, no means of controlling the distance between the side of the short edges of the photovoltaic assemblies and the surface of the wood pallet on the vertical turnover machine is provided for the preceding turnover packaging apparatus. Therefore the phenomenon of short-edge hidden cracking easily occurs during the turnover process.

3. The photovoltaic assemblies are directly turned over from the horizontal and stacked state with the short edges as turnover edges to the vertical state with the short edges as the bottom at one time. During the turnover process, the center of gravity of the photovoltaic assemblies is high, and the long edges bear a long arm of the shear force. In this case, the middle part is prone to bending and deformation in the direction of the long edges of the photovoltaic assemblies, increasing the risk of hidden cracking.

SUMMARY

The present disclosure provides a high-precision vertical turnover machine and method for packaging a photovoltaic assembly to greatly improve the turnover safety and precision of the assembly.

The present disclosure implements the preceding object through the technical solutions below. A high-precision vertical turnover machine for packaging a photovoltaic assembly is provided. The machine includes a first drum conveyor line for forward and backward conveying, a horizontal transfer mechanism configured to drive the first drum conveyor line to move left and right between a receiving station and a first turnover station, a first turnover mechanism located on a left side of the first drum conveyor line and configured to turn over a photovoltaic assembly on the first drum conveyor line by 90 degrees with a long edge of the photovoltaic assembly as a turnover edge, a second turnover mechanism located on a left side of the first turnover mechanism and configured to turn over the photovoltaic assembly by 90 degrees with a right-angle corner of the photovoltaic assembly as a turnover center, a distance detecting sensor located on a front side of the first turnover mechanism or a rear side of the first turnover mechanism and configured to detect a position of a front surface of the photovoltaic assembly on the first turnover mechanism or a distance of a rear surface of the photovoltaic assembly on the first turnover mechanism, and a lifting correction transfer mechanism configured to move the photovoltaic assembly on the first turnover mechanism to a second turnover station and place the photovoltaic assembly on the second turnover mechanism precisely according to a detection result of the distance detecting sensor.

Further, the first drum conveyor line includes a drum holder, several first roller shafts arranged in front-rear directions and rotatably disposed on the drum holder, a first motor fixed on the drum holder and configured to drive the first roller shafts to rotate for conveying, and a first positioning module for positioning an iron pallet on the first roller shafts. A first photoelectric sensor and a second photoelectric sensor are disposed on the drum holder, where the first photoelectric sensor is configured to monitor whether a photovoltaic assembly stack enters the first drum conveyor line, and the second photoelectric sensor is configured to monitor whether the photovoltaic assembly stack reaches a set position.

Further, the horizontal transfer mechanism includes a ground rail holder, a pair of slide rails disposed on the ground rail holder in parallel, a rack parallel to the pair of slide rails, a second motor fixed on the drum holder, and a drive gear which is configured to be driven by the second motor to rotate and meshes with the rack for transmission.

Further, the first turnover mechanism includes first turnover holders and second cylinders configured to drive the first turnover holders to turn over. Each of the first turnover holders includes a first support plate and a second support plate perpendicular to each other. Each of the first turnover holders is configured to be driven by a respective one of the second cylinders to switch between a first turnover state and a second turnover state. In the first turnover state, the second support plate is vertical, the first support plate is horizontal and is embedded in the first drum conveyor line, and a first avoidance notch for the first support plate to insert into is disposed in the first drum conveyor line. In the second turnover state, the first support plate is vertical, the second support plate is horizontal, and the lifting correction transfer mechanism is located between two second support plates to move a photovoltaic assembly stack located on the two second support plates to the second turnover mechanism.

Further, a fastening assembly configured to fasten an iron pallet is disposed on the first support plate. The fastening assembly includes a third cylinder and a claw, where the third cylinder is fixed on the first support plate, and the claw is configured to be driven by the third cylinder to move parallel to a support plane of the first support plate.

Further, the lifting correction transfer mechanism includes a base, a lift driving member disposed on the base, a lift platform configured to be driven by the lift driving member to move up and down, a third motor fixed on the lift platform, a front-and-rear correction platform configured to be driven by the third motor to move front and rear, a fourth motor fixed on the front-and-rear correction platform, a multi-stage telescopic arm configured to be driven by the fourth motor to move left and right.

Further, the second turnover mechanism includes a second turnover holder and a fourth cylinder configured to drive the second turnover holder to switch between a third turnover state and a fourth turnover state. The second turnover holder includes a first support frame and a second support frame perpendicular to each other. A support platform is disposed on the first support frame. A second drum conveyor line for forward and backward conveying and a second positioning module for positioning a wood pallet on the second drum conveyor line are disposed on the second support frame. In the third turnover state, the first support frame is horizontal, and the support platform is docked with a left side of the lifting correction transfer mechanism. In the fourth turnover state, the second drum conveyor line is horizontal.

Further, second avoidance notch for the multi-stage telescopic arm to extend into is disposed on the support platform.

The present disclosure further provides a high-precision vertical turnover method for packaging a photovoltaic assembly. The method is implemented based on the preceding high-precision vertical turnover machine for packaging a photovoltaic assembly and includes the steps below.

In S1, a horizontal photovoltaic assembly stack located on an iron pallet is conveyed through a first drum conveyor line in front-rear directions in place, and the horizontal photovoltaic assembly stack is pushed left as a whole for positioning.

In S2, a horizontal transfer mechanism drives the first drum conveyor line to move left as a whole to a first turnover station, where the horizontal photovoltaic assembly stack is located above a support plate on one side of a first turnover mechanism.

In S3, a fastening assembly on the first turnover mechanism fixes the iron pallet; then the first turnover mechanism turns over the horizontal photovoltaic assembly stack by 90 degrees to be the vertical photovoltaic assembly stack locating on another support plate of the first turnover mechanism; then the first turnover mechanism turns over reversely, and the fastening assembly loosens and the iron pallet returns to the first drum conveyor line for output.

In S4, a distance detecting sensor detects a position of a front surface of the vertical photovoltaic assembly stack or a position of a rear surface of the vertical photovoltaic assembly stack to obtain surface position information.

In S5, a lifting correction transfer mechanism includes a multi-stage telescopic arm and a drive module configured to drive the multi-stage telescopic arm to move up and down, front and rear, and left and right. Front and rear positions of the multi-stage telescopic arm are adjusted according to the surface position information to enable the multi-stage telescopic arm to support the vertical photovoltaic assembly stack in a central region of the vertical photovoltaic assembly stack. The multi-stage telescopic arm lifts the vertical photovoltaic assembly stack, then move the vertical photovoltaic assembly stack left to a second turnover station, and locate the vertical photovoltaic assembly stack above a support frame on one side of a second turnover mechanism, where a second drum conveyor line is disposed on a support frame on another side of the second turnover mechanism. A wood pallet is placed on the second drum conveyor line and fixed through a second positioning module. Then the multi-stage telescopic arm move forward by a set distance so that a distance between the front surface of the vertical photovoltaic assembly stack and a surface of the wood pallet meets the set distance required for turning over. Then the vertical photovoltaic assembly stack is placed on the second turnover mechanism.

In S6, the second turnover mechanism turns over by 90 degrees. The vertical photovoltaic assembly stack having a long edge below is turned over to have a short edge below using a right-angle corner of the photovoltaic assembly as a turnover center. The second positioning module releases a fixed force on the wood pallet. The photovoltaic assembly stack turned over is conveyed out through the second drum conveyor line.

Compared with the existing art, the beneficial effects of the high-precision vertical turnover machine and method for packaging a photovoltaic assembly in the present disclosure lie in that the turnover safety and precision of the assembly can be improved greatly. Specifically, the beneficial effects are as follows:

1. The vertical turnover action of the photovoltaic assembly is completed in two steps. In the first turnover action, horizontal turnover is performed with a long edge of the photovoltaic assembly as a turnover edge. The second turnover action is based on the photovoltaic assembly stack in the vertical state, and vertical turnover is performed with the right angle at an intersection of a long edge at the bottom and a short edge at the front as a turnover center. In the first turnover action, because a long edge is used as the turnover edge and has reliable support strength, the risk of hidden cracking of the assembly during the turnover process is small. In the second turnover action, because the photovoltaic assembly is already in the vertical state, the center of gravity of the photovoltaic assembly is on the same plane as the center of gravity of the turnover action. The gravity load of the photovoltaic assembly is a line load. The original method is to turn over the photovoltaic assembly directly from the horizontal state to the vertical state with a short edge as a turnover edge. In this case, the gravity load of the photovoltaic assembly is a surface load. Compared with the surface load, the line load has less risk of hidden cracking and less risk of bending and deformation in the middle. Therefore, the two-step turnover action greatly reduces the risk of vertical turnover damage to the photovoltaic assembly and improves product safety.

2. When the photovoltaic assembly enters the first turnover station, precise conveying is implemented through the horizontal transfer mechanism so that the distance between the turnover edge of the photovoltaic assembly and the second support plates in the first turnover mechanism can be controlled precisely, avoiding excessively large or small turnover drops and thus avoiding hidden cracking or cracking caused by a high-drop fall or narrow space squeezing.

3. When the photovoltaic assembly enters the second turnover station, the distance detecting sensor detects the distance of the front surface of the photovoltaic assembly or the rear surface of the photovoltaic assembly and matches the lifting correction transfer mechanism to correct and adjust the front and rear positions of the photovoltaic assembly. On one hand, such an arrangement guarantees that the lifting correction transfer mechanism can implement the lifting of the photovoltaic assembly stably and reliably, preventing the photovoltaic assembly from slipping during the lifting process due to the deviation of the center of gravity. On the other hand, such an arrangement lays the foundation for the subsequent control of the distance between the front surface of the photovoltaic assembly and the surface of the wood pallet on the second turnover mechanism, guaranteeing that the distance between the front surface of the photovoltaic assembly and the surface of the wood pallet meets turnover requirements, avoiding excessively large or small turnover drops effectively, thereby avoiding hidden cracking or cracking caused by a high-drop fall or narrow space squeezing, and thus further improving the safety and reliability of the photovoltaic assembly in the turnover process.

Figure 1:
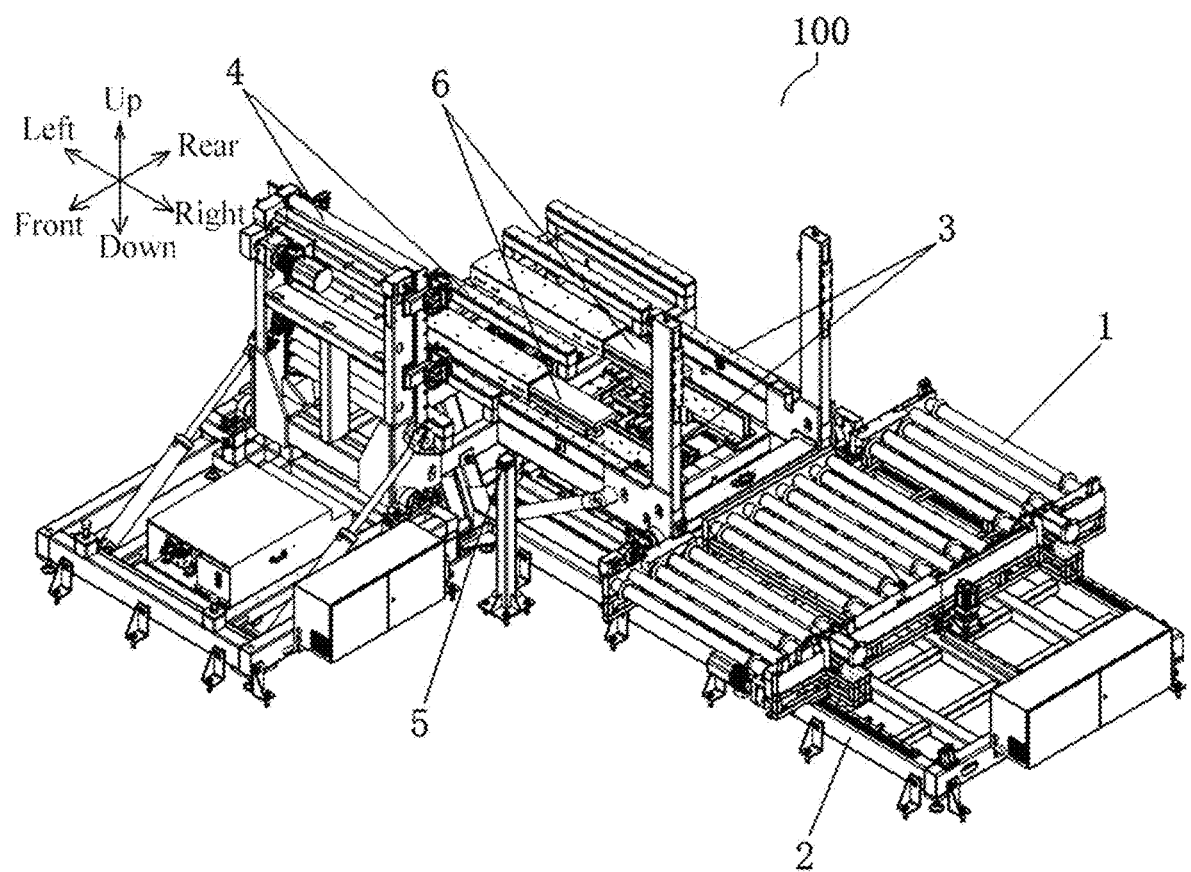
FIG. 1 is a perspective view in an embodiment of the present disclosure.
Figure 2:
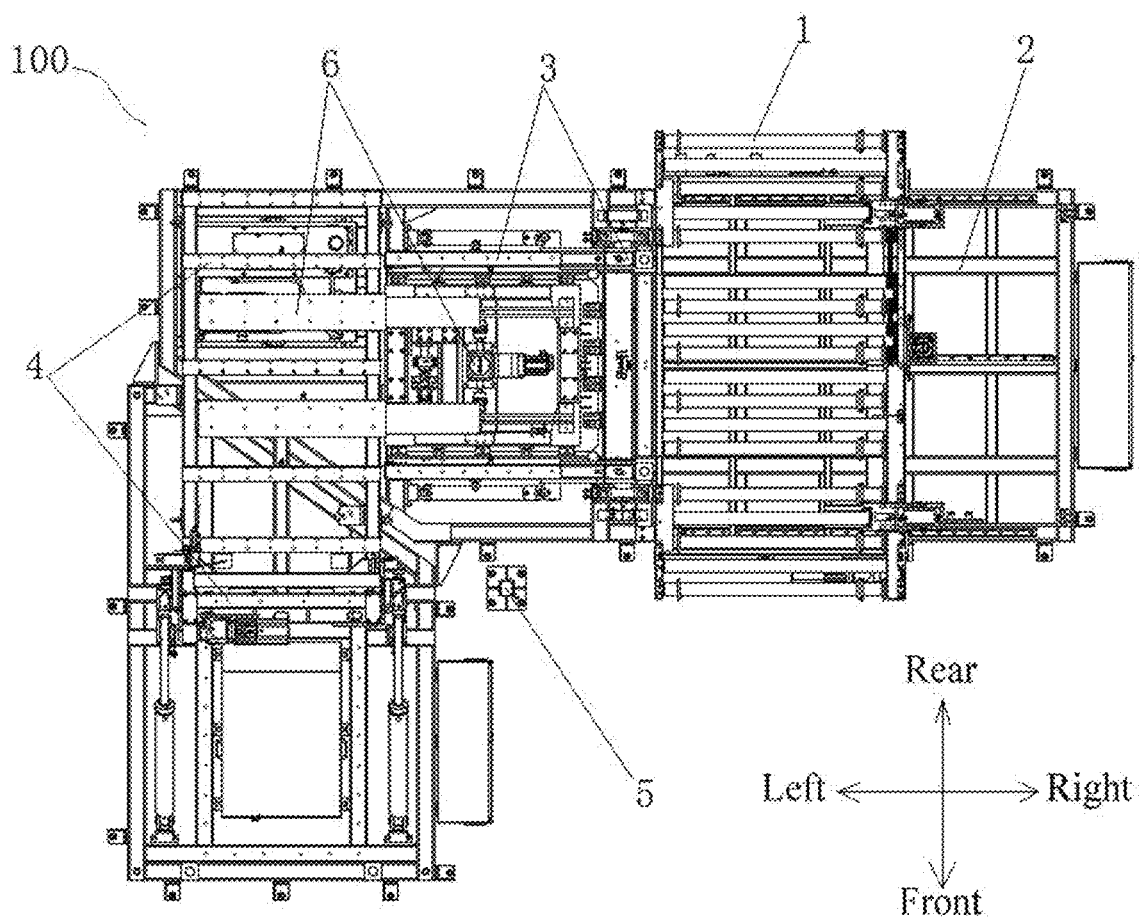
FIG. 2 is a top view in an embodiment of the present disclosure.
Figures 3, 4:
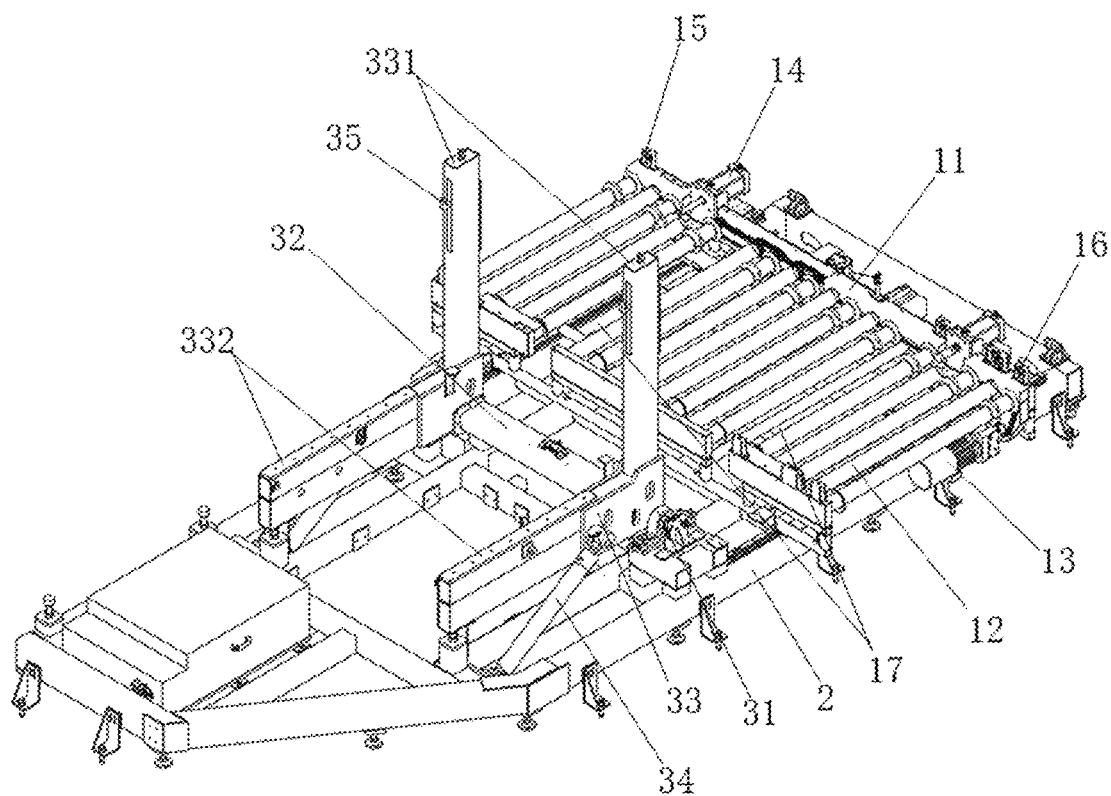
FIG. 3 is a perspective view of a first drum conveyor line, a horizontal transfer module, and a first turnover mechanism in an embodiment of the present disclosure.
FIG. 4 is a front view of FIG. 3.
Figure 5:
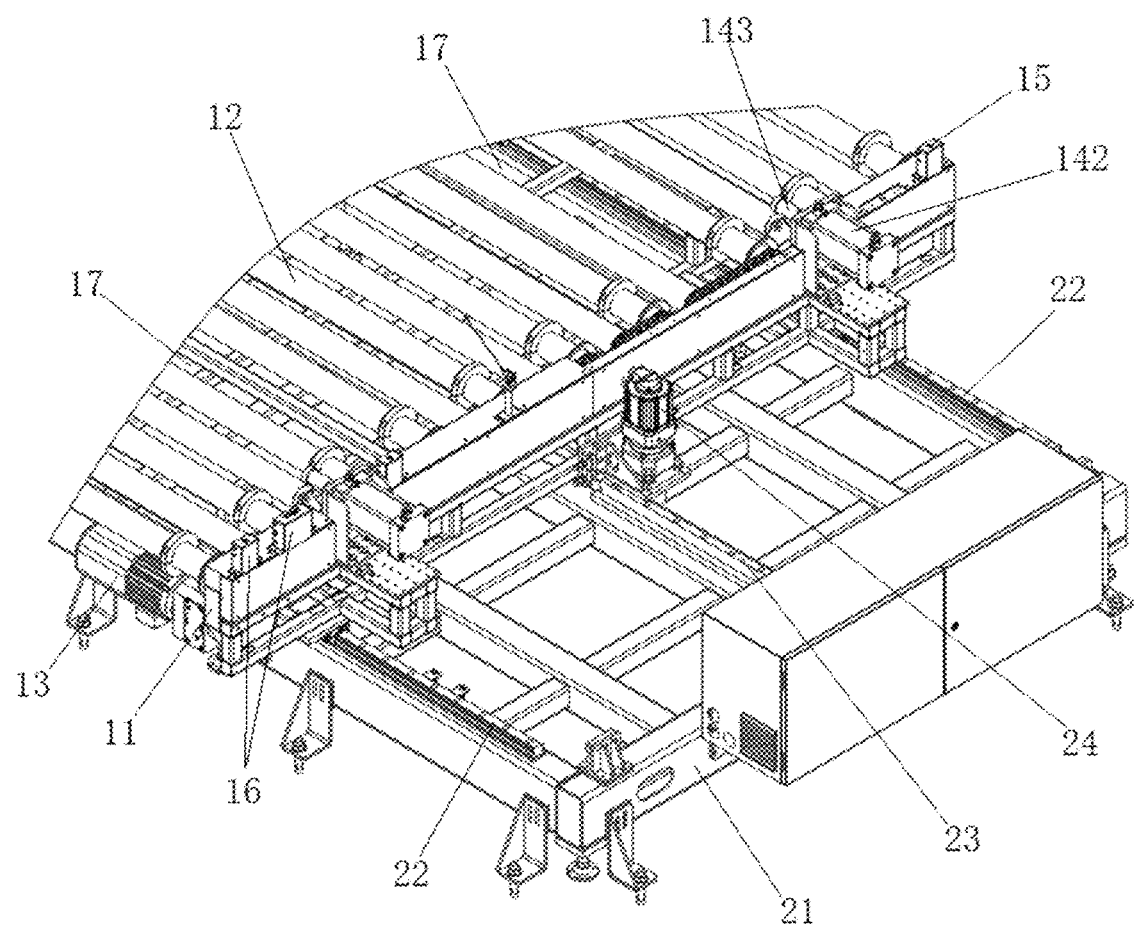
FIG. 5 is a partial structure view in an embodiment of the present disclosure.
Figure 6:
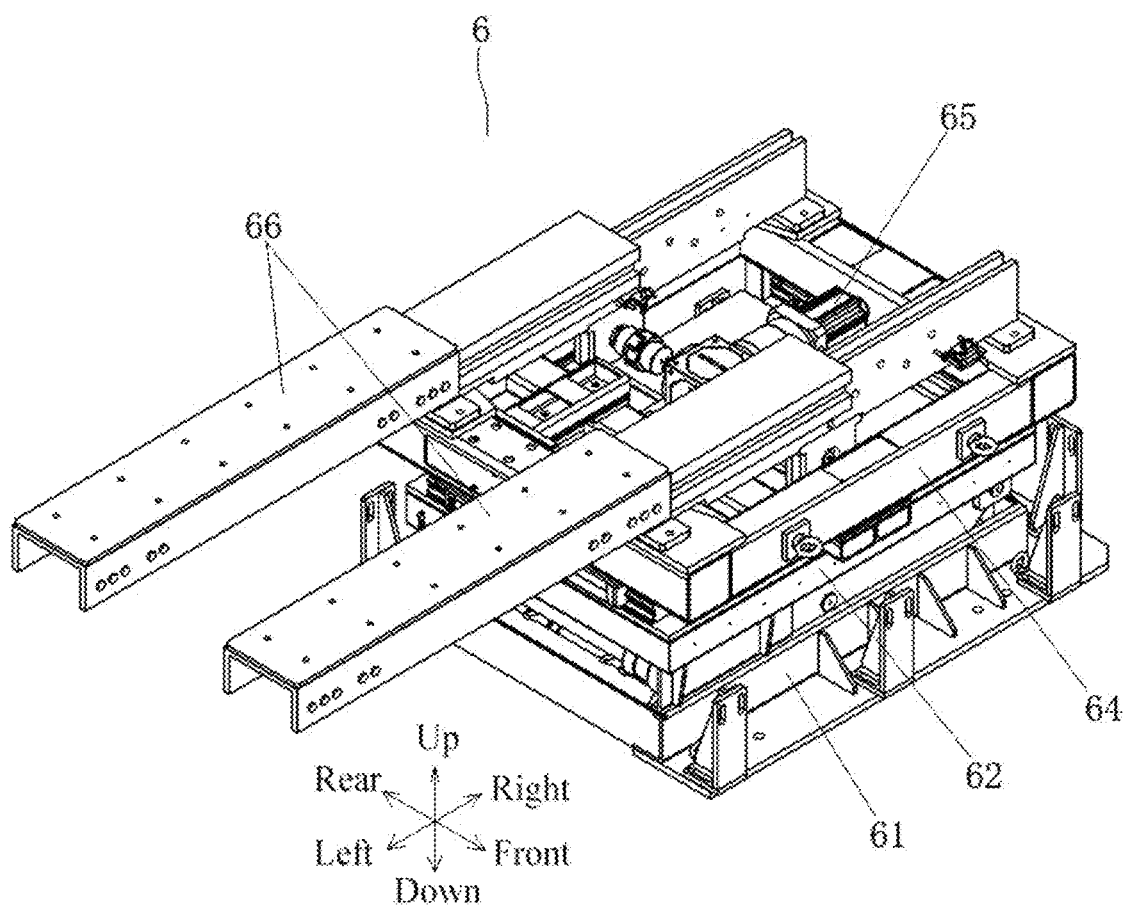
FIG. 6 is a perspective view of a lifting correction transfer mechanism in an embodiment of the present disclosure.
Figure 7:
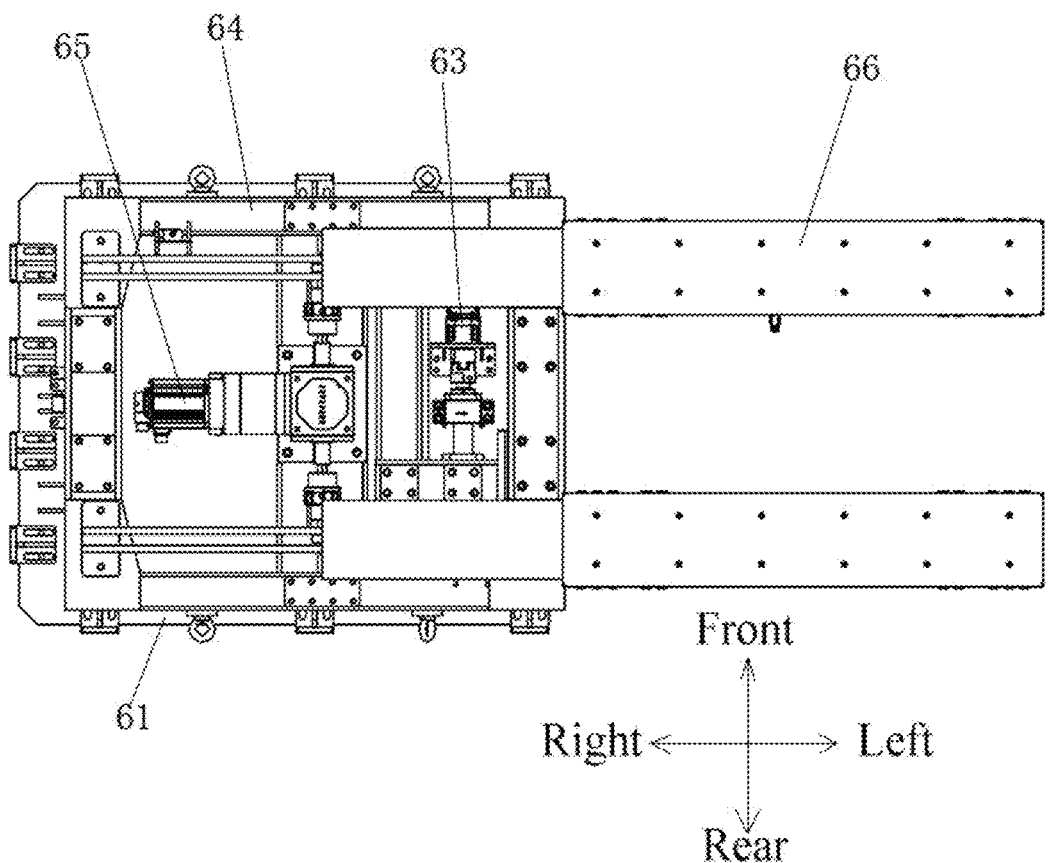
FIG. 7 is a top view of the lifting correction transfer mechanism in an embodiment of the present disclosure.
Figure 8:
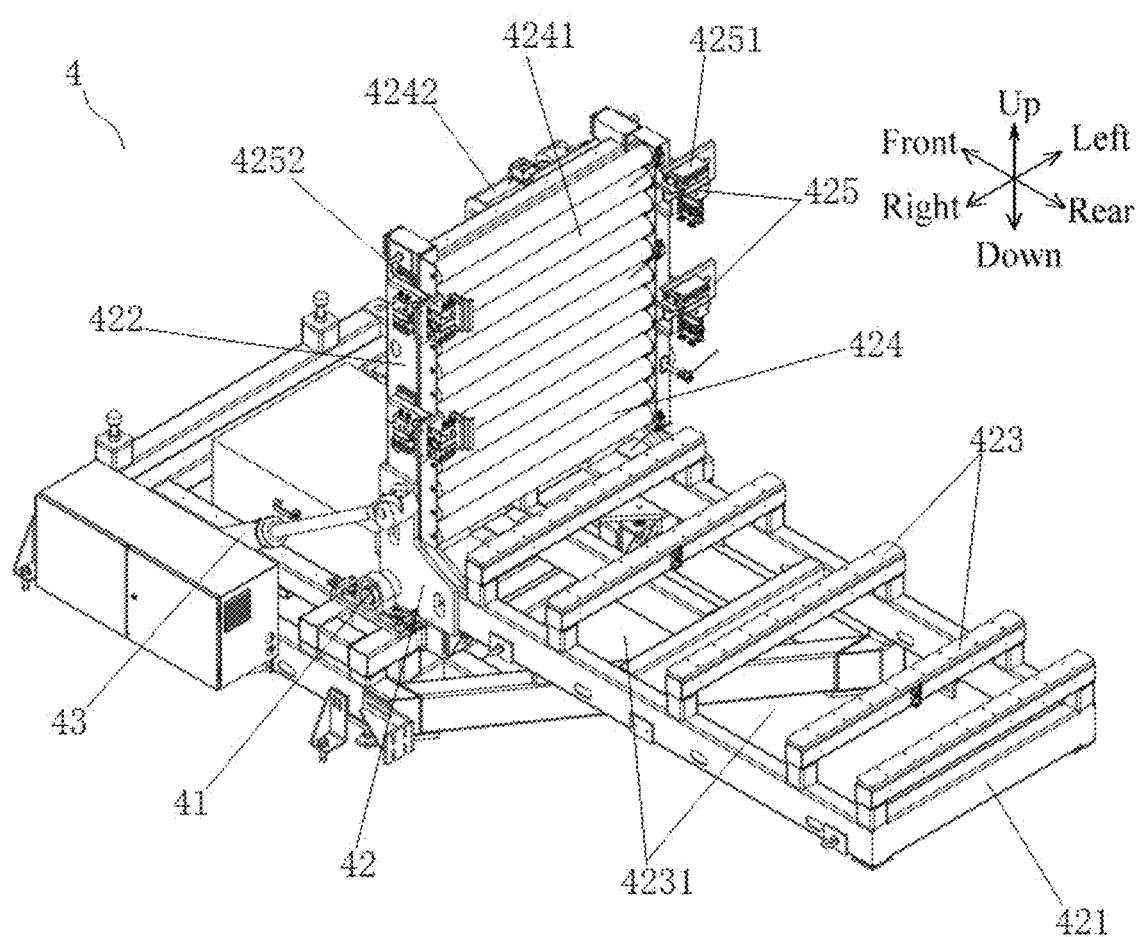
FIG. 8 is a perspective view of a second turnover mechanism in an embodiment of the present disclosure.
Figure 9:
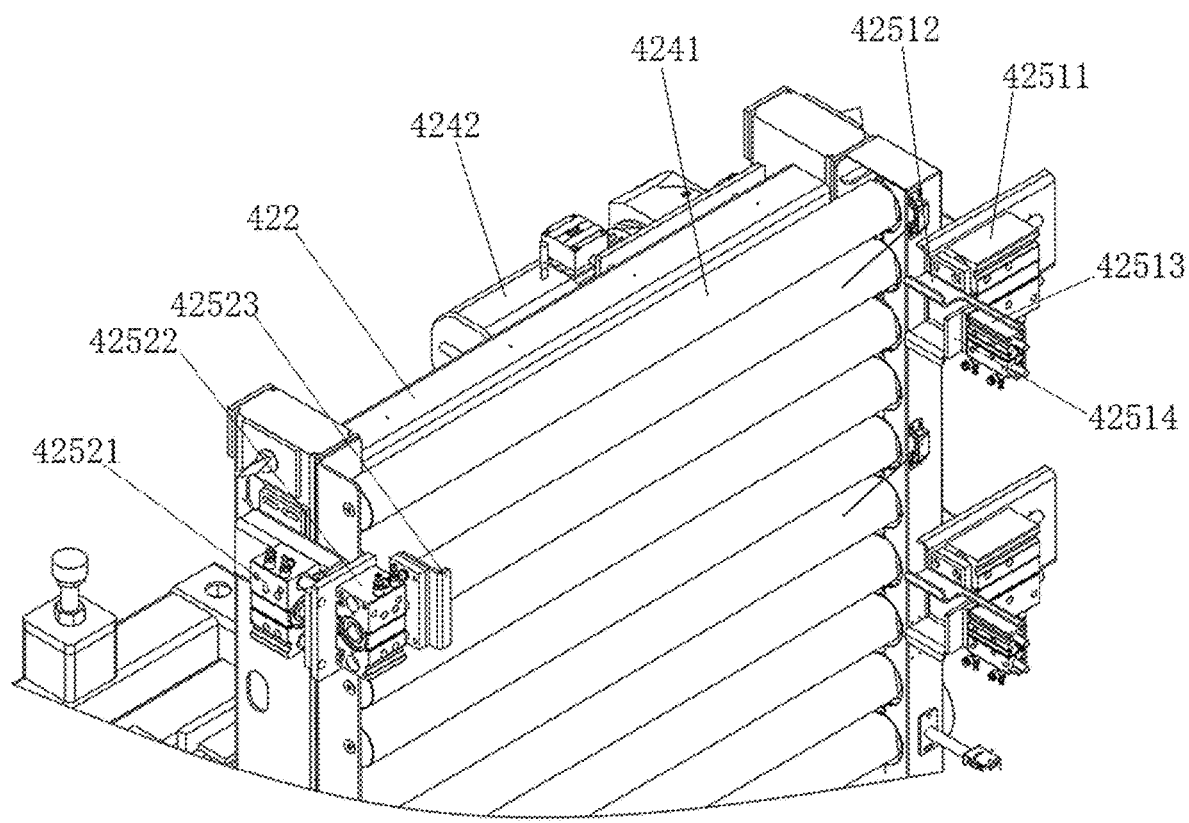
FIG. 9 is a partial structure view of the second turnover mechanism in an embodiment of the present disclosure.

REFERENCE LIST 100 high-precision vertical turnover machine for packaging a photovoltaic assembly
1 first drum conveyor line
11 drum holder
12 first roller shaft
13 first motor
14 first positioning module
141 fixing limit member
142 first cylinder
143 right compression member
15 first photoelectric sensor
16 second photoelectric sensor
17 first avoidance notch
2 horizontal transfer mechanism
21 ground rail holder
22 slide rail
23 rack
24 second motor
3 first turnover mechanism
31 first hinge seat
32 rotary shaft
33 first turnover holder
331 first support plate
332 second support plate
34 second cylinder
35 fastening assembly
351 claw
4 second turnover mechanism
41 second hinge seat
42 second turnover holder
421 first support frame
422 second support frame
423 support platform
4231 second avoidance notch
424 second drum conveyor line
4241 second roller shaft
4242 fifth motor
425 second positioning module
4251 first positioning assembly
42511 fifth cylinder
42512 limit plate
42513 sixth cylinder
42514 first pressing plate
4252 second positioning assembly
42521 seventh cylinder
42522 eighth cylinder
42523 second pressing plate
43 fourth cylinder
5 distance detecting sensor
6 lifting correction transfer mechanism
61 base
62 lift platform
63 third motor
64 front-and-rear correction platform
65 fourth motor
66 multi-stage telescopic arm

DETAILED DESCRIPTION

Embodiment One

Referring to FIGS. 1 to 9, this embodiment provides a high-precision vertical turnover machine for packaging a photovoltaic assembly. The machine includes a first drum conveyor line 1 for forward and backward conveying, a horizontal transfer mechanism 2 driving the first drum conveyor line 1 to move left and right between a receiving station and a first turnover station, a first turnover mechanism 3 located on the left side of the first drum conveyor line 1 and turning over a photovoltaic assembly on the first drum conveyor line 1 by 90 degrees with a long edge of the photovoltaic assembly as a turnover edge, a second turnover mechanism 4 located on the left side of the first turnover mechanism 3 and turning over the photovoltaic assembly by 90 degrees with a right-angle corner of the photovoltaic assembly as a turnover center, a distance detecting sensor 5 located on the front side of the first turnover mechanism 3 or the rear side of the first turnover mechanism 3 and detecting the distance of the front surface of the photovoltaic assembly on the first turnover mechanism 3 or the distance of the rear surface of the photovoltaic assembly on the first turnover mechanism 3, and a lifting correction transfer mechanism 6 moving, according to a detection result of the distance detecting sensor 5, the photovoltaic assembly on the first turnover mechanism 3 to a second turnover station and placing the photovoltaic assembly on the second turnover mechanism 4 precisely.

The first drum conveyor line 1 includes a drum holder 11, several first roller shafts 12 arranged in front-rear directions and rotatably disposed on the drum holder 11, a first motor 13 fixed on the drum holder 11 and driving the first roller shafts 12 to rotate for conveying, and a first positioning module 14 for positioning an iron pallet on the first roller shafts 12. A first photoelectric sensor 15 and a second photoelectric sensor 16 are disposed on the drum holder 11. The first photoelectric sensor 15 monitors whether a photovoltaic assembly stack enters the first drum conveyor line 1. The second photoelectric sensor 16 monitors whether the photovoltaic assembly stack reaches a set position.

The first positioning module 14 includes a fixing limit member 141 limiting a left side edge of the iron pallet, a first cylinder 142 fixed on the right side of the drum holder 11, and a right compression member 143 driven by the first cylinder 142 to move left and right and matching the fixing limit member 141 to position the left side of the iron pallet and the right side of the iron pallet.

The first drum conveyor line 1 is at the receiving station. Conveyor lines are docked with front and rear sides of the first drum conveyor line 1. A conveyor line on one side is configured to input the photovoltaic assembly stack to be turned over. A conveyor line on the other side is configured to output the recycled iron pallet.

The horizontal transfer mechanism 2 includes a ground rail holder 21, a pair of slide rails 22 disposed on the ground rail holder 21 in parallel, a rack 23 parallel to the pair of slide rails 22, a second motor 24 fixed on the drum holder 11, and a drive gear driven by the second motor 24 to rotate and meshing with the rack 23.

The first turnover mechanism 3 includes a rotary shaft 32 on a pair of first hinge seats 31, a pair of first turnover holders 33 fixed on the rotary shaft 32, and second cylinders 34 driving the first turnover holders 33 to turn over around the axis of the rotary shaft 32. A first turnover holder 33 includes a first support plate 331 and a second support plate 332 perpendicular to each other. Each of the first turnover holders is driven by a respective second cylinder 34 to switch between a first turnover state and a second turnover state. In the first turnover state, the second support plate 332 is vertical, the first support plate 331 is horizontal and is embedded in the first drum conveyor line 1, and a first avoidance notch 17 for the first support plate 331 to insert into is disposed in the first drum conveyor line 1. In the second turnover state, the first support plate 331 is vertical, the second support plate 332 is horizontal, and the lifting correction transfer mechanism 6 is located between two second support plates 332 to move the photovoltaic assembly stack located on the two second support plates 332 to the second turnover mechanism 4.

Referring to FIG. 1, in the initial state, the first drum conveyor line 1 receives materials at the receiving station. After a horizontal photovoltaic assembly stack enters the first drum conveyor line 1, the first drum conveyor line 1 conveys the horizontal photovoltaic assembly stack in place and stops. Then the first positioning module 14 pushes the horizontal photovoltaic assembly stack to the left and positions and fixes the horizontal photovoltaic assembly stack. The horizontal transfer mechanism 2 drives the first drum conveyor line 1 to carry the horizontal photovoltaic assembly stack to the first turnover station. In this case, first support plates 331 enter first avoidance notches 17 and are located below the first roller shafts 12. The first turnover mechanism 3 performs a turnover action, switches from the first turnover state to the second turnover state, and turns over the horizontal photovoltaic assembly stack on the first drum conveyor line 1 to the vertical photovoltaic assembly stack, and places the vertical photovoltaic assembly stack above the lifting correction transfer mechanism 6, implementing the first horizontal turnover action of the photovoltaic assembly stack with a long edge of the photovoltaic assembly as a turnover edge.

When the second photoelectric sensor 16 on the first drum conveyor line 1 monitors that the photovoltaic assembly stack reaches the set position, the first roller shafts 12 stop performing conveying. The position of the photovoltaic assembly stack is monitored by the photoelectric sensor solely. The first motor 13 is used to stop driving the first roller shafts 12 to continue rotation to achieve the stop position of the photovoltaic assembly, and the precision of the stop position is very low. Moreover, the photovoltaic assembly still has inertia after the first roller shafts 12 stop performing conveying. Therefore, the position of the photovoltaic assembly stack finally stopping on the first drum conveyor line 1 is not precise. Accordingly, after the first turnover mechanism 3 turns over the photovoltaic assembly stack from the first drum conveyor line 1 for the first time, this embodiment uses the distance detecting sensor 5 to precisely detect the distance of the front surface of the photovoltaic assembly stack or the distance of the rear surface of the photovoltaic assembly stack, providing a correction basis for the subsequent position of the photovoltaic assembly stack on the second turnover mechanism 4 and guaranteeing that the position of the photovoltaic assembly stack on the second turnover mechanism 4 precisely meets turnover requirements.

Additionally, the incoming position state of the photovoltaic assembly stack entering the first drum conveyor line 1 is uncertain. Therefore, to prevent the photovoltaic assembly stack from impacting the second support plates 332 in the first turnover mechanism 3 and to guarantee that the relative position of the photovoltaic assembly stack against the first turnover mechanism 3 meets turnover requirements before the first turnover mechanism 3 is turned over, that is, to guarantee that the distance between the left surface of the photovoltaic assembly stack and the second support plates 332 of the first turnover mechanism 3 is not excessively large so as to avoid a damage to the assembly due to a relatively large height drop during the turnover process, the horizontal transfer mechanism 2 matches the first positioning module 14 to convey the photovoltaic assembly stack to the first turnover mechanism 3 precisely, guaranteeing that the first turnover action is performed reliably and safely.

When the first turnover mechanism 3 is turned over, the incoming iron pallet is turned over together with the photovoltaic assembly. To guarantee that the reversed iron pallet is kept on the first turnover mechanism 3 so that the iron pallet can return to the first drum conveyor line 1 for output and recycling, a fastening assembly 35 for fastening the iron pallet is disposed on a first support plate 331 in the first turnover mechanism 3. The fastening assembly 35 includes a third cylinder and a claw 351. The third cylinder is fixed on the first support plate 331. The claw 351 is driven by the third cylinder to move parallel to a support plane of the first support plate 331. The fastening assembly 35 matches a respective second support plate 332 to fasten and fix two opposite sides of the iron pallet.

The lifting correction transfer mechanism 6 includes a base 61, a lift driving member disposed on the base 61, a lift platform 62 driven by the lift driving member to move up and down, a third motor 63 fixed on the lift platform 62, a front-and-rear correction platform 64 driven by the third motor 63 to move front and rear, a fourth motor 65 fixed on the front-and-rear correction platform 64, multi-stage telescopic arms 66 driven by the fourth motor 65 to move left and right.

The second turnover mechanism 4 includes a second turnover holder 42 and a fourth cylinder 43. The second turnover holder 42 is rotatably disposed on a pair of second hinge seats 41. The fourth cylinder 43 drives the second turnover holder 42 to switch between a third turnover state and a fourth turnover state. The second turnover holder includes a first support frame 421 and a second support frame 422 perpendicular to each other. A support platform 423 is disposed on the first support frame 421. A second drum conveyor line 424 for forward and backward conveying and a second positioning module 425 for positioning a wood pallet on the second drum conveyor line 424 are disposed on the second support frame 422. In the third turnover state, the first support frame 421 is horizontal, and the support platform 423 is docked with the left side of the lifting correction transfer mechanism 6. In the fourth turnover state, the second drum conveyor line 424 is horizontal.

The second drum conveyor line 424 includes several second roller shafts 4241 and a fifth motor 4242. The second roller shafts 4241 are rotatably disposed on the second support frame 422 in a front and rear arrangement. The fifth motor 4242 is fixed on the second support frame 422 and drives the second roller shafts 4241 to rotate.

To enable the lifting correction transfer mechanism 6 to place the photovoltaic assembly stack entirely on the support frame 423, second avoidance notches 4231 for the multi-stage telescopic arms 66 to extend into are disposed on the support platform 423.

The second positioning module 425 includes a first positioning assembly 4251 and a second positioning assembly 4252 that are disposed on front and rear sides of the second support frame 422. The first positioning assembly 4251 includes a fifth cylinder 42511 fixed on the second support frame 422, a limit plate 42512 driven by the fifth cylinder 42511 to move left and right, a sixth cylinder 42513 fixed on the limit plate 42512, and a first pressing plate 42514 driven by the sixth cylinder 42513 to move up and down. The second positioning assembly 4252 includes a seventh cylinder 42521 fixed on the second support frame 422, an eighth cylinder 42522 driven by the seventh cylinder 42521 to move up and down, and a second pressing plate 42523 driven by the eighth cylinder 42522 to move left and right.

Referring to FIG. 1, after the first turnover mechanism 3 is turned over to reach the second turnover state, the vertical photovoltaic assembly stack is located on the second support plates 332. Then the distance detecting sensor 5 detects the distance of the front surface of the vertical photovoltaic assembly stack or the distance of the rear surface of the vertical photovoltaic assembly stack. The third motor 63 drives the multi-stage telescopic arms 66 to carry the vertical photovoltaic assembly stack and perform a position adjustment in front-rear directions so that the support center of each multi-stage telescopic arm 66 can be aligned with the center of a respective long edge of the vertical photovoltaic assembly stack. Then the lift driving member drives the multi-stage telescopic arms 66 to lift the vertical photovoltaic assembly stack. Then the vertical photovoltaic assembly stack needs to be placed on the support platform 423 on the second turnover mechanism 4. To prevent the vertical photovoltaic assembly stack from interfering with a mechanism (for example, the second drum conveyor line 424 or the second positioning module 425) on the second support frame 422. After obtaining and carrying the vertical photovoltaic assembly stack, the multi-stage telescopic arms 66 in this embodiment returns the vertical photovoltaic assembly stack to the initial center of the multi-stage telescopic arms 66 in the front-rear directions according to requirements to avoid collision. If it is detected that the front surface of the vertical photovoltaic assembly stack does not interfere with the second positioning module 425 in this case, the multi-stage telescopic arms 66 do not need to return to the initial center. In this case, the second turnover mechanism 4 is turned over to reach the third turnover state. The wood pallet is placed on the second drum conveyor line 424 and is positioned and fixed through the second positioning module 425. The fourth motor 65 drives the multi-stage telescopic arms 66 to carry the photovoltaic assembly stack to move to the left above the support platform 423. The multi-stage telescopic arms 66 extend into the second avoidance notches 4231 and then move forward so that the distance between the front surface of the photovoltaic assembly stack and the surface of the wood pallet meets set requirements. Then the photovoltaic assembly stack is placed on the support platform 423. In this case, the distance between the front surface of the photovoltaic assembly stack and the surface of the wood pallet meets a set distance required for turning over. Moreover, the front surface of the photovoltaic assembly stack can be precisely aligned with the entire support surface of the wood pallet through the precise conveying of the fourth motor 65. The second turnover mechanism 4 is turned over to reach the fourth turnover state. The vertical photovoltaic assembly stack with a long edge below completes the second vertical turnover action with a right-angle corner of the photovoltaic assembly as a turnover center. After being turned over in place, the second positioning module 425 loosens the fixed force on the wood pallet. The wood pallet and the photovoltaic assembly stack turned over are conveyed together under the conveying action of the second drum conveyor line 424.

This embodiment further provides a high-precision vertical turnover method for packaging a photovoltaic assembly. The method includes the steps below.

In S1, the horizontal photovoltaic assembly stack is conveyed through the first drum conveyor line 1 in place in the front-rear directions and is pushed left by the first positioning module 14 as a whole for positioning.

In S2, the horizontal transfer mechanism 2 drives the first drum conveyor line 1 to move left as a whole to the first turnover station. In this case, the first turnover mechanism 3 is in the receiving state, and the first support plates 331 of the first turnover mechanism 3 extend into the first drum conveyor line 1 and are located below the iron pallet.

In S3, fastening assemblies 35 on the first support plates 331 match the second support plates 332 in the first turnover mechanism 3 to fix the iron pallet. The first positioning module 14 releases the fixed force on the iron pallet. The first turnover mechanism 3 is turned over by 90 degrees to reach the outgoing state, turns over the horizontal photovoltaic assembly stack to the vertical photovoltaic assembly stack, and locates the vertical photovoltaic assembly stack on the second support plates 332 of the first turnover mechanism 3. Then the first turnover mechanism 3 returns to the receiving state. The fastening assemblies 35 loosen. The iron pallet returns to the first drum conveyor line 1 and is output through the first drum conveyor line 1.

In S4, the distance detecting sensor 5 detects the position of the front surface of the vertical photovoltaic assembly stack or the position of the rear surface of the vertical photovoltaic assembly stack to obtain surface position information.

In S5, the lifting correction transfer mechanism 6 adjusts front and rear positions of the multi-stage telescopic arms 66 according to the surface position information to enable the multi-stage telescopic arms 66 to support the vertical photovoltaic assembly stack in a central region of the vertical photovoltaic assembly stack. The multi-stage telescopic arms 66 move upward to lift the vertical photovoltaic assembly stack away from the second support plates 332. Then the multi-stage telescopic arms 66 move the vertical photovoltaic assembly stack left to the second turnover station. Then the multi-stage telescopic arms 66 move forward by the set distance so that the distance between the front surface of the vertical photovoltaic assembly stack and the surface of the wood pallet meets the set distance required for turning over. Then the vertical photovoltaic assembly stack is placed on the support platform 423 of the second turnover mechanism 4.

In S6, the second turnover mechanism 4 turns over by 90 degrees and turns over the vertical photovoltaic assembly stack having a long edge below to have a short edge below using a right-angle corner of the photovoltaic assembly as a turnover center. The second positioning module 425 on the second turnover mechanism 4 releases a fixed force on the wood pallet. The photovoltaic assembly stack turned over is conveyed out through the second drum conveyor line 424.

What is claimed is:

1. A high-precision vertical turnover machine for packaging a photovoltaic assembly, comprising a first drum conveyor line for forward and backward conveying, a horizontal transfer mechanism configured to drive the first drum conveyor line to move left and right between a receiving station and a first turnover station, a first turnover mechanism located on a left side of the first drum conveyor line and configured to turn over a photovoltaic assembly on the first drum conveyor line by 90 degrees with a long edge of the photovoltaic assembly as a turnover edge, a second turnover mechanism located on a left side of the first turnover mechanism and configured to turn over the photovoltaic assembly by 90 degrees with a right-angle corner of the photovoltaic assembly as a turnover center, a distance detecting sensor located on a front side of the first turnover mechanism or a rear side of the first turnover mechanism and configured to detect a position of a front surface of the photovoltaic assembly on the first turnover mechanism or a position of a rear surface of the photovoltaic assembly on the first turnover mechanism, and a lifting correction transfer mechanism configured to move the photovoltaic assembly on the first turnover mechanism to a second turnover station and place the photovoltaic assembly on the second turnover mechanism precisely according to a detection result of the distance detecting sensor;

wherein the lifting correction transfer mechanism comprises a base, a lift driving member disposed on the base, a lift platform configured to be driven by the lift driving member to move up and down, a third motor fixed on the lift platform, a front-and-rear correction platform configured to be driven by the third motor to move front and rear, a fourth motor fixed on the front-and-rear correction platform, a multi-stage telescopic arm configured to be driven by the fourth motor to move left and right;

wherein the second turnover mechanism comprises a second turnover holder and a fourth cylinder configured to drive the second turnover holder to switch between a third turnover state and a fourth turnover state; the second turnover holder comprises a first support frame and a second support frame perpendicular to each other; a support platform is disposed on the first support frame; a second drum conveyor line for forward and backward conveying and a second positioning module for positioning a wood pallet on the second drum conveyor line are disposed on the second support frame; in the third turnover state, the first support frame is horizontal, and the support platform is docked with a left side of the lifting correction transfer mechanism; and in the fourth turnover state, the second drum conveyor line is horizontal;

wherein a second avoidance notch for the multi-stage telescopic arm to extend into is disposed on the support platform.

2. The high-precision vertical turnover machine for packaging a photovoltaic assembly according to claim 1, wherein the first drum conveyor line comprises a drum holder, a plurality of first roller shafts arranged in front-rear directions and rotatably disposed on the drum holder, a first motor fixed on the drum holder and configured to drive the first roller shafts to rotate for conveying, and a first positioning module for positioning an iron pallet on the first roller shafts; and a first photoelectric sensor and a second photoelectric sensor are disposed on the drum holder, wherein the first photoelectric sensor is configured to monitor whether a photovoltaic assembly stack enters the first drum conveyor line, and the second photoelectric sensor is configured to monitor whether the photovoltaic assembly stack reaches a set position.

3. The high-precision vertical turnover machine for packaging a photovoltaic assembly according to claim 2, wherein the horizontal transfer mechanism comprises a ground rail holder, a pair of slide rails disposed on the ground rail holder in parallel, a rack parallel to the pair of slide rails, a second motor fixed on the drum holder, and a drive gear which is configured to be driven by the second motor to rotate and meshes with the rack for transmission.

4. The high-precision vertical turnover machine for packaging a photovoltaic assembly according to claim 1, wherein the first turnover mechanism comprises first turnover holders and second cylinders configured to drive the first turnover holders to turn over; each of the first turnover holders comprises a first support plate and a second support plate perpendicular to each other; each of the first turnover holders is configured to be driven by a respective one of the second cylinders to switch between a first turnover state and a second turnover state; in the first turnover state, the second support plate is vertical, the first support plate is horizontal and is embedded in the first drum conveyor line, and a first avoidance notch for the first support plate to insert into is disposed in the first drum conveyor line; and in the second turnover state, the first support plate is vertical, the second support plate is horizontal, and the lifting correction transfer mechanism is located between two second support plates to move a photovoltaic assembly stack located on the two second support plates to the second turnover mechanism.

5. The high-precision vertical turnover machine for packaging a photovoltaic assembly according to claim 4, wherein a fastening assembly configured to fasten an iron pallet is disposed on the first support plate; and the fastening assembly comprises a third cylinder and a claw, wherein the third cylinder is fixed on the first support plate, and the claw is configured to be driven by the third cylinder to move parallel to a support plane of the first support plate.

6. A high-precision vertical turnover method for packaging a photovoltaic assembly, implemented based on the high-precision vertical turnover machine for packaging a photovoltaic assembly according to claim 1, comprising following steps:
- in S1, conveying, through a first drum conveyor line in front-rear directions, a horizontal photovoltaic assembly stack located on an iron pallet in place, and pushing the horizontal photovoltaic assembly stack left as a whole for positioning;
- in S2, driving, by a horizontal transfer mechanism, the first drum conveyor line to move left as a whole to a first turnover station, wherein the horizontal photovoltaic assembly stack is located above a support plate on one side of a first turnover mechanism;
- in S3, fixing, by a fastening assembly on the first turnover mechanism, the iron pallet; then turning over, by the first turnover mechanism, the horizontal photovoltaic assembly stack by 90 degrees to be a vertical photovoltaic assembly stack locating on another support plate of the first turnover mechanism; and then turning over the first turnover mechanism reversely, loosening the fastening assembly, and returning the iron pallet to the first drum conveyor line for output;
- in S4, detecting, by a distance detecting sensor, a position of a front surface of the vertical photovoltaic assembly stack or a position of a rear surface of the vertical photovoltaic assembly stack to obtain surface position information;
- in S5, a lifting correction transfer mechanism comprising a multi-stage telescopic arm and a drive module configured to drive the multi-stage telescopic arm to move up and down, front and rear, and left and right; adjusting front and rear positions of the multi-stage telescopic arm according to the surface position information to enable the multi-stage telescopic arm to support the vertical photovoltaic assembly stack in a central region of the vertical photovoltaic assembly stack; lifting, by the multi-stage telescopic arm, the vertical photovoltaic assembly stack; then moving, by the multi-stage telescopic arm, the vertical photovoltaic assembly stack left to a second turnover station; locating, by the multi-stage telescopic arm, so as to locate the vertical photovoltaic assembly stack above a support frame on one side of a second turnover mechanism, wherein a second drum conveyor line is disposed on a support frame on another side of the second turnover mechanism; placing a wood pallet on the second drum conveyor line and fixing the wood pallet through a second positioning module; then moving, by the multi-stage telescopic arm, forward by a set distance so that a distance between the front surface of the vertical photovoltaic assembly stack and a surface of the wood pallet meets a set distance required for turning over; and then placing the vertical photovoltaic assembly stack on the second turnover mechanism; and
- in S6, turning over the second turnover mechanism by a 90-degree so that the vertical photovoltaic assembly stack having a long edge located below is turned over to have a short edge located below using a right-angle corner of the photovoltaic assembly as a turnover center; releasing, by the second positioning module, a fixed force on the wood pallet; and conveying out, through the second drum conveyor line, the photovoltaic assembly stack that is turned over.

* * * * *